(12) United States Patent
Kelman et al.

(10) Patent No.: US 7,374,323 B1
(45) Date of Patent: May 20, 2008

(54) SELF-ILLUMINATION APPLIQUE SYSTEM AND METHOD

(75) Inventors: Zinoviy Kelman, Bloomfield Hills, MI (US); Yuriy Taborisskiy, West Bloomfield, MI (US); Ching Fong, Canton, MI (US)

(73) Assignee: Yazaki North America, Inc., Canton, MI (US)

(*) Notice: Subject to any disclaimer, the term of this patent is extended or adjusted under 35 U.S.C. 154(b) by 211 days.

(21) Appl. No.: 11/191,634

(22) Filed: Jul. 28, 2005

(51) Int. Cl.
*B20Q 1/00* (2006.01)
(52) U.S. Cl. ............... 362/489; 362/27; 362/30; 116/49; 116/228
(58) Field of Classification Search ............ 362/23, 362/26, 27, 29, 30, 602–605, 489, 511, 559, 362/560; 116/250, 49, 286–288; 349/68
See application file for complete search history.

(56) References Cited

U.S. PATENT DOCUMENTS

| | | | |
|---|---|---|---|
| 2,459,694 A | 1/1949 | Gordon | |
| 2,831,453 A * | 4/1958 | Hardesty | 116/288 |
| 2,858,632 A | 11/1958 | Caserio et al. | |
| 3,094,970 A | 6/1963 | Zargarpur | |
| 3,431,721 A | 3/1969 | Slaugh | |
| 3,436,242 A | 4/1969 | Schaffner | |
| 3,574,993 A * | 4/1971 | Black | 368/67 |
| 4,004,546 A * | 1/1977 | Harland | 116/288 |
| 4,163,428 A * | 8/1979 | Ishikawa | 116/288 |
| 4,258,643 A * | 3/1981 | Ishikawa et al. | 116/286 |
| 4,263,594 A * | 4/1981 | Masucci | 345/102 |
| 4,274,358 A * | 6/1981 | Nakamura et al. | 116/288 |
| 4,323,951 A | 4/1982 | Pasco | |
| 4,561,042 A | 12/1985 | Wehner et al. | |
| 4,970,400 A * | 11/1990 | Muramatsu | 250/463.1 |
| 5,050,527 A | 9/1991 | Kameda | |
| 5,219,135 A | 6/1993 | Scott | |
| 5,426,621 A | 6/1995 | Akasaka | |
| 5,521,342 A | 5/1996 | Bartley et al. | |
| 5,678,912 A | 10/1997 | Ayres et al. | |
| 5,703,612 A * | 12/1997 | Salmon et al. | 340/815.78 |
| 5,845,598 A | 12/1998 | Ross et al. | |
| 5,920,150 A * | 7/1999 | Crary et al. | 313/484 |
| 5,997,161 A | 12/1999 | Stringfellow et al. | |
| 6,025,820 A * | 2/2000 | Salmon et al. | 345/75.1 |
| 6,070,549 A * | 6/2000 | Iuchi et al. | 116/287 |
| 6,146,716 A | 11/2000 | Narang | |
| 6,682,201 B2 | 1/2004 | Kneer et al. | |
| 6,692,132 B1 | 2/2004 | Meeker | |
| 2004/0017687 A1 | 1/2004 | Misaras | |
| 2004/0089219 A1* | 5/2004 | Burau et al. | 116/288 |

FOREIGN PATENT DOCUMENTS

EP     0 282 606 A1     9/1988

\* cited by examiner

*Primary Examiner*—Sandra L. O'Shea
*Assistant Examiner*—Gunyoung T. Lee
(74) *Attorney, Agent, or Firm*—Harness, Dickey & Pierce, P.L.C.

(57) ABSTRACT

The various embodiments of the present invention generally include a display device having a surface with indicia formed thereon. The indicia are indicative of at least one vehicle parameter. The display device includes a light guide connected to the surface and a light-reflecting portion formed in the light guide. The light-reflecting portion is disposed at least partially over one of the indicia. The light guide collects light, directs the light toward the light-reflecting portion and illuminates at least one of the indicia. The light guide and the light reflecting portion provide an enhanced or decorative effect for one or more of the indicia.

20 Claims, 10 Drawing Sheets

SELF-ILLUMINATION APPLIQUE SYSTEM AND METHOD

FIELD OF THE INVENTION

The present invention relates to a dash panel display and more particularly relates to an appliqué that is decoratively enhanced by ambient light.

BACKGROUND OF THE INVENTION

Typical instrument clusters may require external light sources to back light or front light the instrument cluster. Moreover, a plurality of layers in an appliqué may be required to produce the typical appearance of the instrument cluster as seen in many vehicles. As such, multiple light sources and multiple layers may be required to illuminate an intricate instrument cluster. The multiple light sources and the multiple layers and different colors of the appliqué may increase cost and complexity of the instrument cluster.

SUMMARY OF THE INVENTION

The various embodiments of the present invention generally include a display device having a surface with indicia formed thereon. The indicia are indicative of at least one vehicle parameter. The display device includes a light guide connected to the surface and a light-reflecting portion formed in the light guide. The light-reflecting portion is disposed at least partially over one of the indicia. The light guide collects light, directs the light toward the light-reflecting portion and illuminates at least one of the indicia.

Further areas of applicability of the various embodiments of the present invention will become apparent from the detailed description and the claims provided hereinafter. It should be understood that the detailed description and the specific examples, while indicating the various embodiments of the present invention are intended for purposes of illustration only and are not intended to limit the scope of the invention.

BRIEF DESCRIPTION OF THE DRAWINGS

The various embodiments of the present invention will become more fully understood from the detailed description, the appended claims, and the accompanying drawings, wherein:

DETAILED DESCRIPTION OF THE VARIOUS EMBODIMENTS

The following description of the various embodiments is merely exemplary in nature and is in no way intended to limit the invention, its application, or uses.

Figure 1:
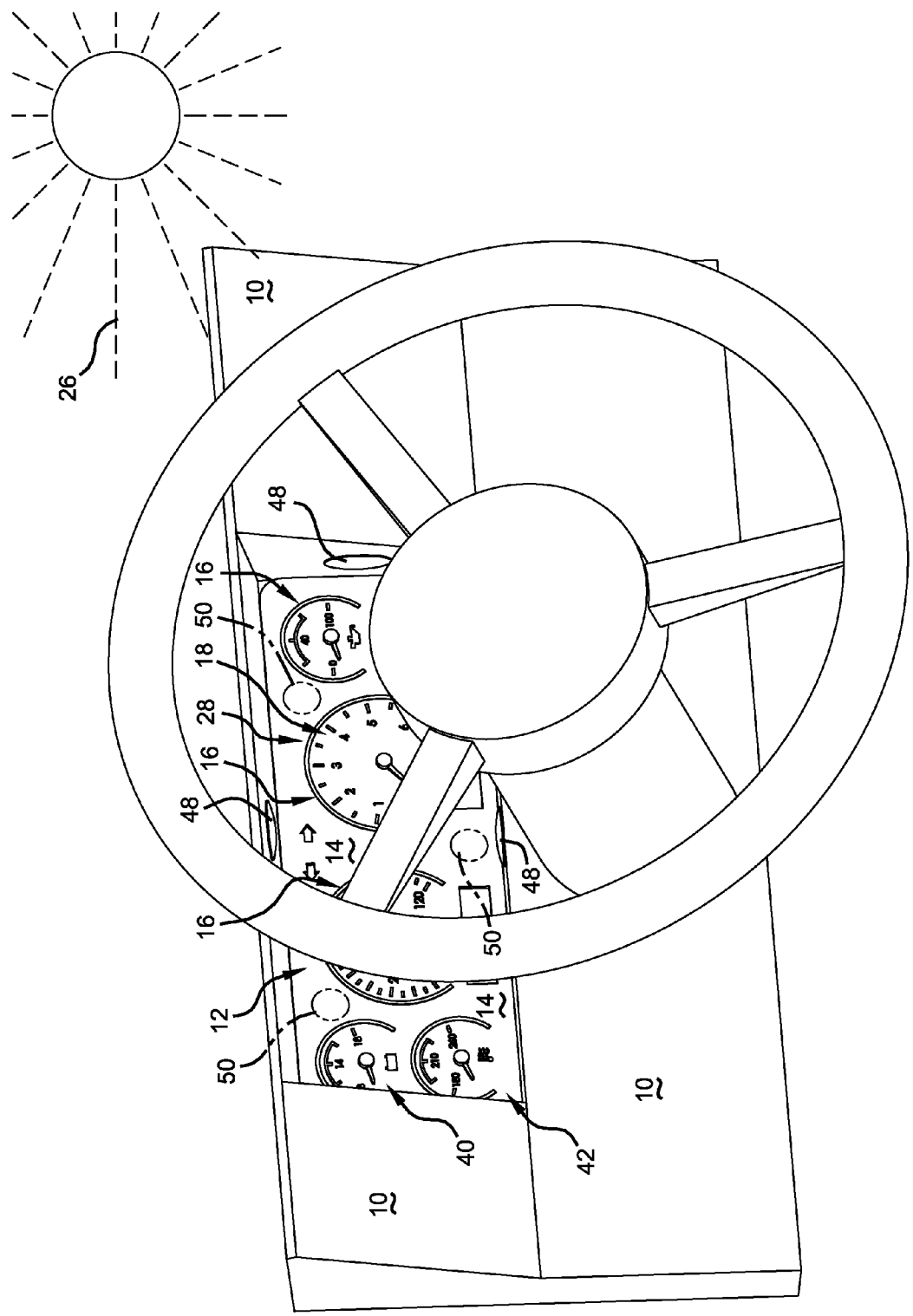
FIG. 1 is a perspective view of an exemplary instrument cluster with a self-illumination system constructed in accordance with the various embodiments of the present invention showing the instrument cluster mounted in a portion of a dash panel.
Figure 2:
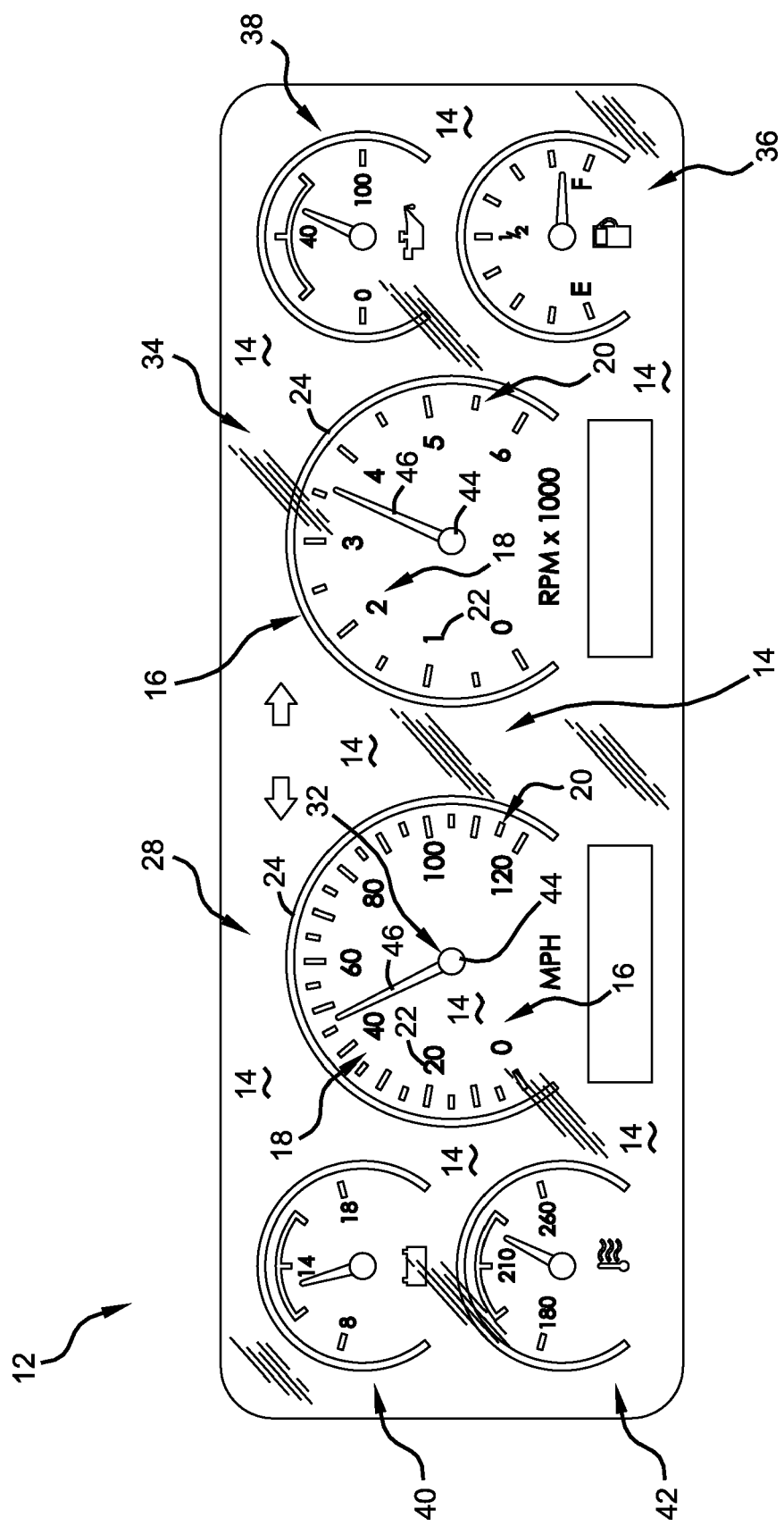
FIG. 2 is a front view of the instrument cluster of FIG. 1 and shows the instrument cluster having indicia that includes tick marks, characters, and borders.
Figure 3:
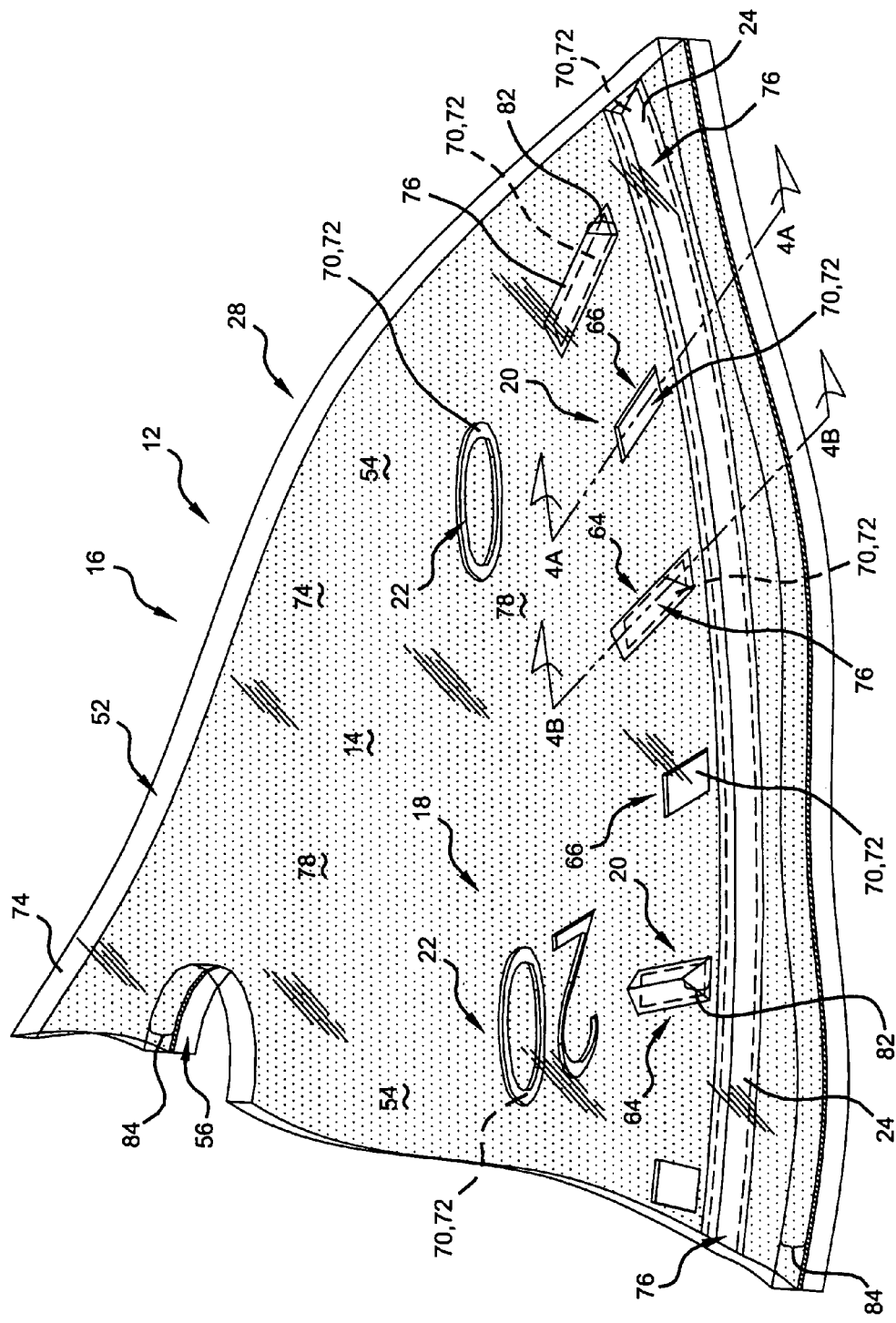
FIG. 3 is an exploded perspective view of the instrument cluster and the self-illumination system from FIG. 2 and shows a light-conducting layer, a masking layer, and a substrate layer constructed in accordance with the various embodiments of the present invention.
Figure 5:
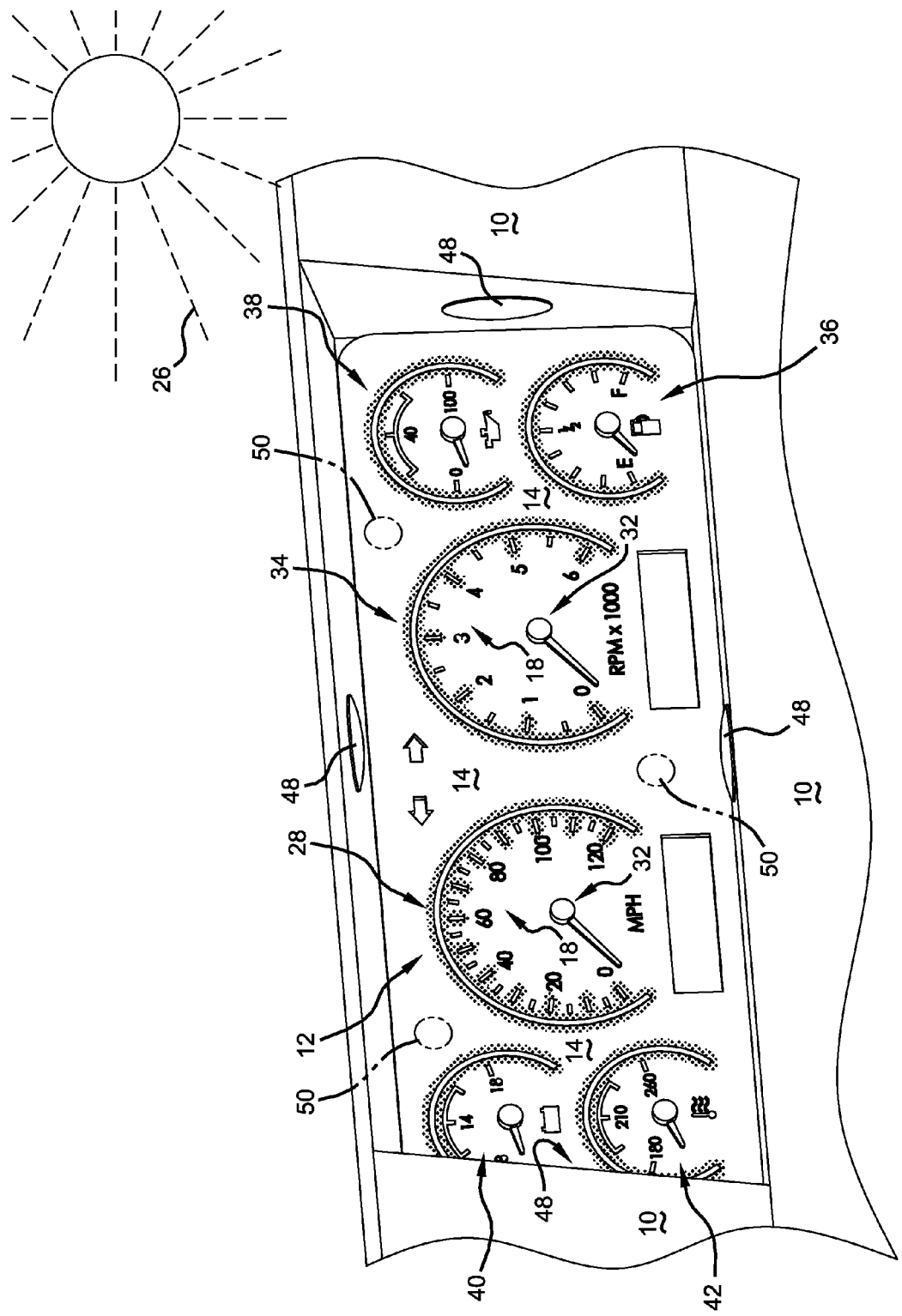
FIG. 5 is a partial perspective view of the dash panel of FIG. 1 and shows the self-illumination system highlighting indicia on the instrument cluster.

With reference to FIGS. 1, 2 and 3, a dash panel 10 includes a display device that may define an instrument cluster 12. The dash panel 10 further includes a self-illumination system 14 that illuminates portions of the instrument cluster 12 and is constructed in accordance with the various embodiments of the present invention. The instrument cluster 12 includes a plurality of instruments, dial faces, or gauges 16. Each of the gauges 16 may include a plurality of indicia 18. The indicia 18 include, but are not limited to, tick marks 20, characters 22, and/or borders 24. The ambient light illumination system 14 may gather light 26 (FIG. 1), ambient and/or otherwise, and/or light from other sources and provides a highlighting, glowing and/or decorative appearance for one or more of the indicia 18, as illustrated in FIG. 5.

In one example, one of the gauges 16 may be a speedometer 28. The speedometer 28 may include the tick marks 20 and the characters 22 (i.e., numbers and/or letters) that may indicate a speed scale 30 (e.g., 10, 20, 30 etc.) The speedometer 28 and/or other gauges 16 may include a pointer 32, which is rotatable relative to the tick marks 20 and the characters 22 to thus indicate vehicle speed. The speedometer 28 may also include the border 24, which may demarcate the speedometer 28 from other gauges 16 on the instrument cluster 12.

The instrument cluster 12 may also include, but is not limited to, a tachometer 34, a fuel gauge 36, an oil pressure gauge 38, a battery voltage gauge 40, an engine temperature gauge 42 and/or other suitable gauges 16 and/or indicators (e.g., warning lights) on the instrument cluster 12 and combinations thereof. It will be appreciated that the various gauges 16 and/or indicators on (or in) the instrument cluster 12 may function and/or be constructed in a similar manner to the speedometer 28 but otherwise indicate their respective vehicle parameters.

Figure 6:
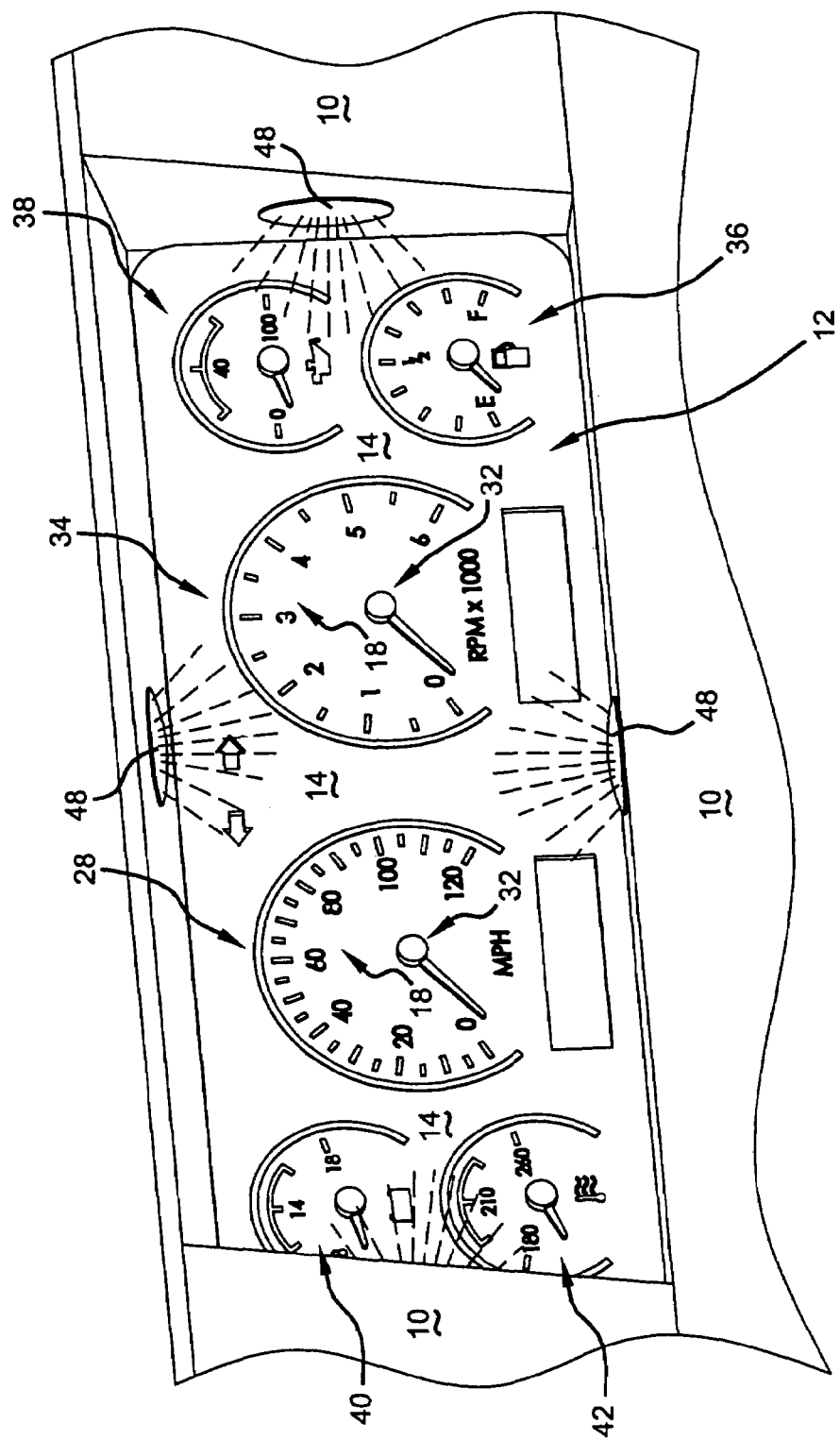
FIG. 6 is a partial perspective view of the dash panel of FIG. 1 and shows four exemplary illumination devices illuminating the instrument cluster.
Figure 7:
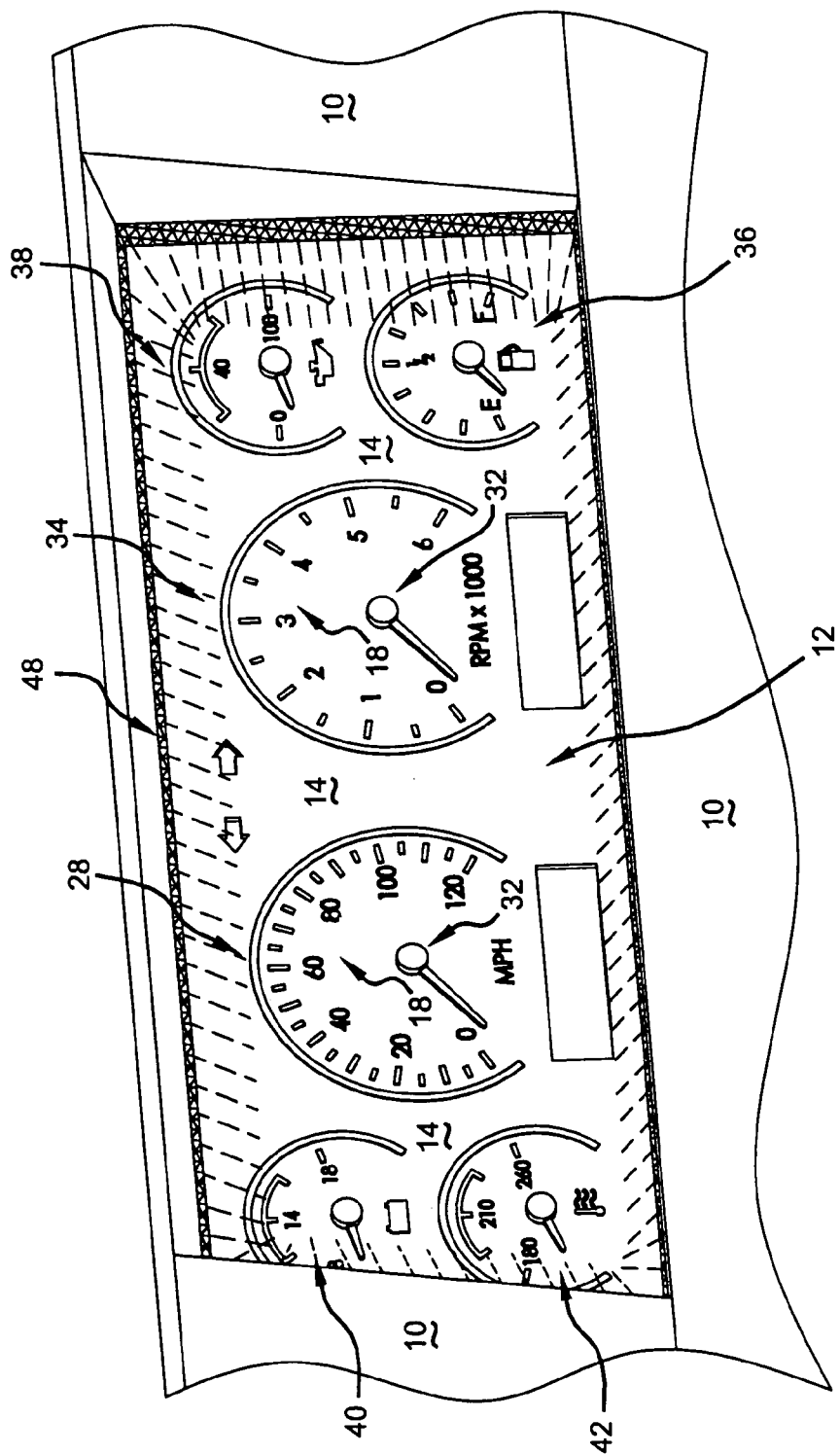
FIG. 7 is similar to FIG. 6 and shows a peripheral illumination device surrounding the instrument cluster.

In one example and with reference to FIG. 2, the rotatable pointer 32 may include a hub portion 44 and a needle portion 46. The needle portion 46 may rotate with the hub portion 44 relative to the characters 22 and/or the tick marks 20. In one example and with reference to FIGS. 1, 6 and 7, the gauges 16 of the instrument cluster 12, the needle portion 46 and/or the hub portion 44 may be illuminated by one or more front illumination devices 48. By way of the above example, the front illumination devices 48 may front-light the instrument cluster 12. The front illumination devices 48 may include, but are not limited to, incandescent lights, fluorescent lights, LEDs, light-ropes (FIG. 7), other suitable illumination devices, and/or combinations thereof.

In another example, portions of each of the gauges 16, the needle portion 46 and/or the hub portion 44 may be illuminated by one or more rear illumination device 50 (also partially shown in phantom in FIG. 1 and FIG. 5), which may be located behind the gauges 16. By way of the above example, the rear illumination device 50 may backlight the instrument cluster 12. The rear illumination devices 50 may be similar to the front illumination devices 48 but are mounted behind the instrument cluster 12. It will be appreciated, therefore, that light 26 may be received from an ambient source like the sun, the front illumination device 48, and/or the rear illumination device 50.

Figure 4A:
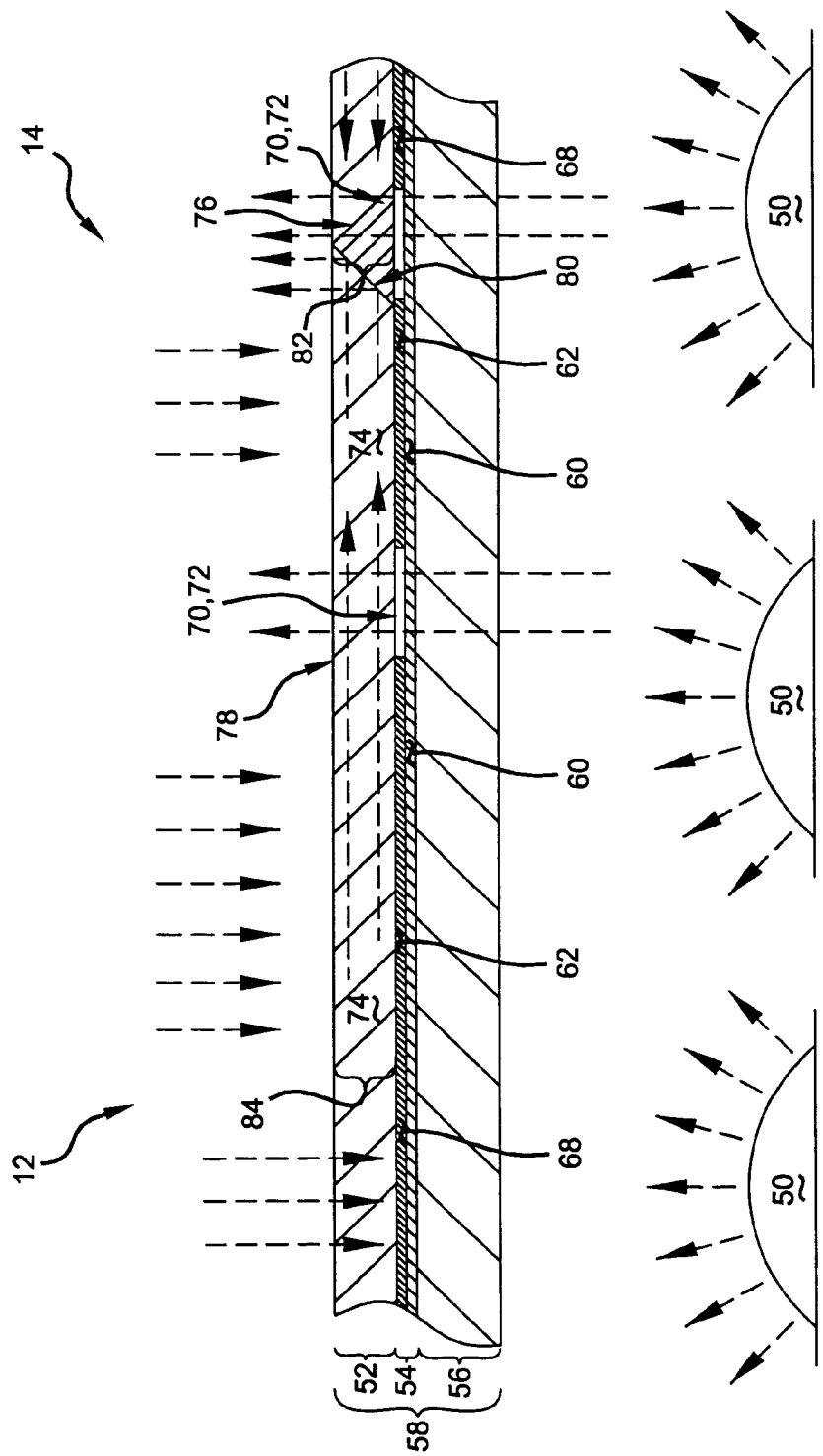
FIG. 4A is a cross-sectional view of the instrument cluster of FIG. 3 and shows the light-conducting layer, the masking layer, the substrate layer and illumination devices backlighting the instrument cluster in accordance with the various embodiments of the present invention.
Figure 4B:
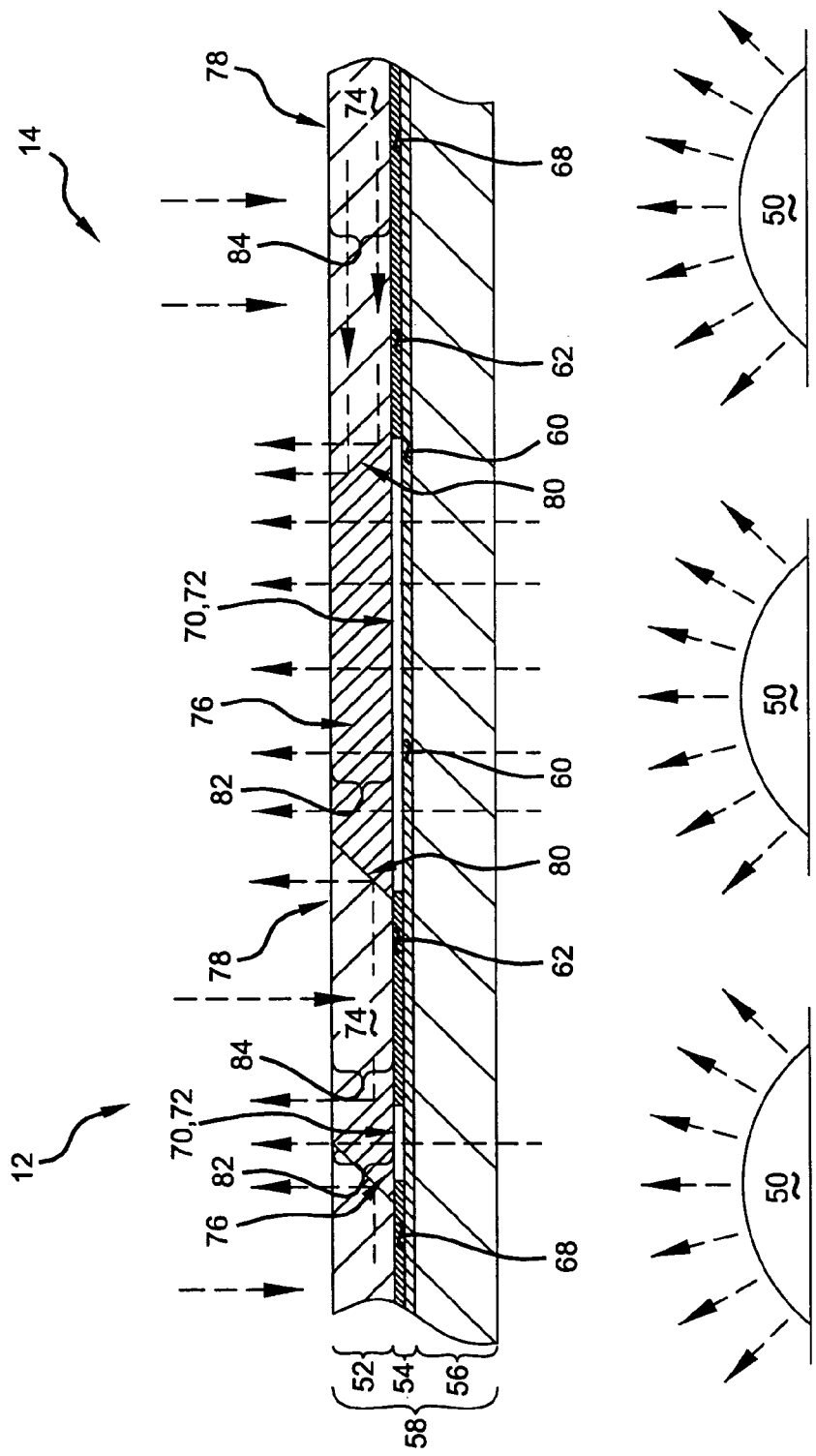
FIG. 4B is a cross-sectional view of the instrument cluster of FIG. 3 and shows the light-reflecting portion of the light conducting layer defining one of the tick marks and the border.
Figure 4C:
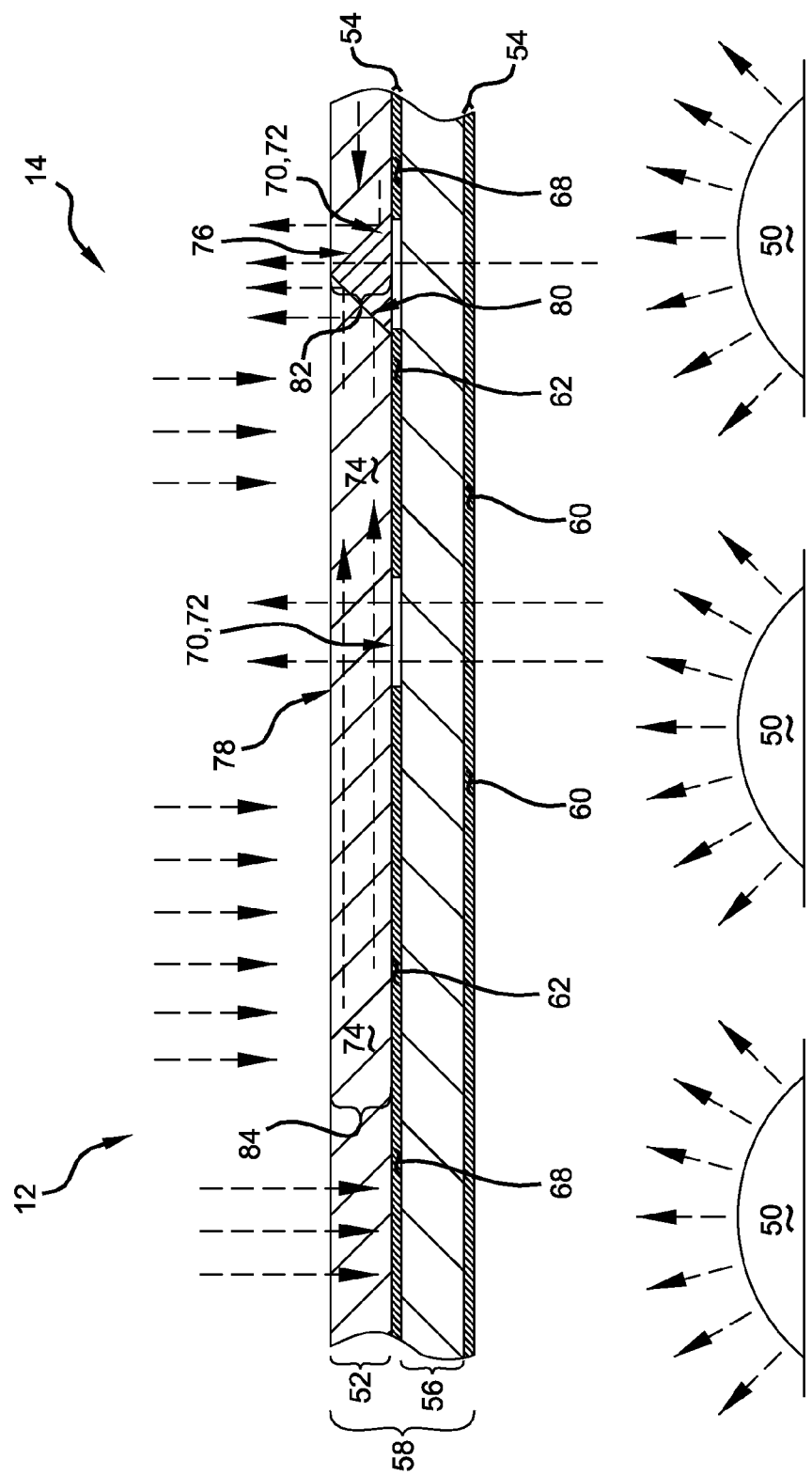
FIG. 4C is similar to FIG. 4A and shows the substrate layer between a first masking layer and a second masking layer.
Figure 4D:
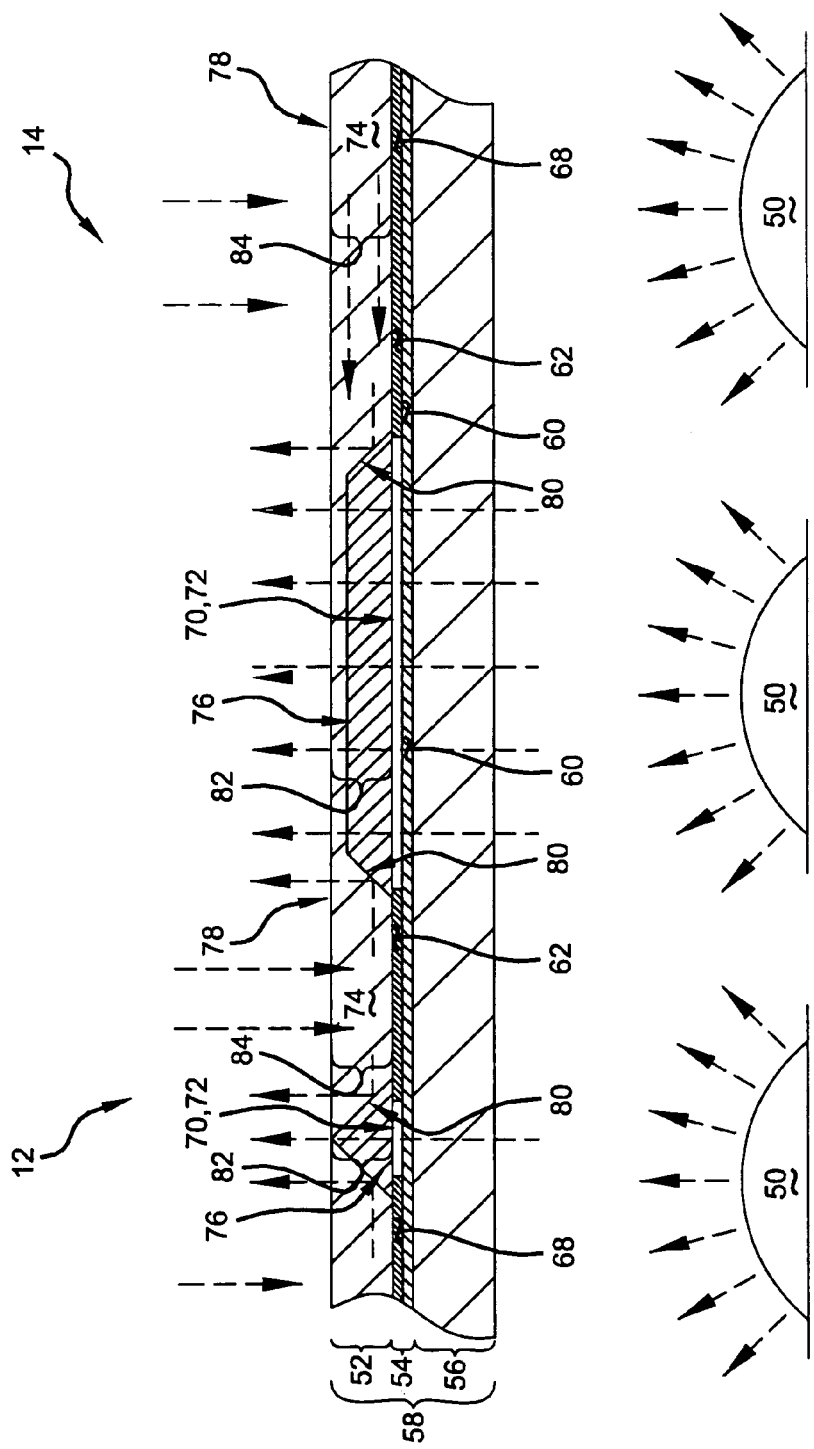
FIG. 4D is similar to FIG. 4B and shows an alternative construction of the light-reflecting portion over one of the tick marks.

With specific reference to FIGS. 3-4D, the instrument cluster 12 and the self-illumination system 14 may be formed from a light conducting layer 52 which may couple to a masking layer 54. The masking layer 54 may couple to a substrate layer 56. It will be appreciated that the layers 52, 54, 56 of the instrument cluster 12 are discussed as a stack 58 and while directions (e.g., up or down) are offered to provide clarity throughout the disclosure, an orientation of the layers 52, 54, 56 may vary (e.g., as the orientation of the dash panel 10 varies) and the orientation of the layers 52, 54, 56 with respect to each other (e.g. as illustrated in FIG. 4C) may vary in the various embodiments of the present invention.

In one example, the substrate layer 56 of the instrument cluster 12 may be made of an approximately transparent material that conducts light. In one example, the substrate layer 56 may be made of a polycarbonate. A suitable polycarbonate includes, but is not limited to, Makrolon® or Lexan® commercially available from various vendors. In other examples, the substrate layer 56 may be made of a transparent material, a translucent material, and/or may have one or more colors such that when light (i.e., full-spectrum light) is passed through the substrate layer 56, only one or more of the colors will pass thus coloring the light through the substrate layer 56. The substrate layer 56 may act as a base layer onto which the masking layer 54 (or portions thereof) may couple.

In one example, the masking layer 54 is formed of a first masking portion 60 and a second masking portion 62. In one example, the first masking portion 60 is coupled to the substrate layer 56 and the second masking portion 62 is coupled to the first masking portion 60, as illustrated in FIGS. 4A and 4B. In one example and with reference to FIG. 4C, the light conducting layer 52 is connected to the second masking portion 62, which is connected to the substrate layer 56. The first masking portion 60 is connected to the substrate layer 56, such that the substrate layer 56 is between the first masking portion 60 and the second masking portion 62. In one example, the first masking portion 60 is omitted. In one example, the masking portions 60, 62 may be coupled to one another and the substrate layer 56 using a suitable adhesive. By way of the above example, the suitable adhesive may be a clear or translucent adhesive. In a further example, the masking portions 60, 62 may be attached to or formed on the substrate layer 56 by printing, silk-screening, and/or other suitable techniques.

In one example, the first masking portion 60 is a translucent layer through which light may pass. In a further example, the first masking portion 60 is white and translucent, which may soften and/or color light that passes therethrough. In another example, the first masking portion 60 is translucent and formed with any suitable color that may contrast with the second masking portion 62. In a further example, the first masking portion 60 may define a light-filtering layer that may soften, add a color, remove a color, reduce intensity of light therethrough and combinations thereof. In one example, the first masking portion 60 may be omitted because, in one example, the substrate layer 56 may be formed with a suitable color or have other light filtering properties similar to that of the first masking portion 60.

In one example, the second masking portion 62 is opaque. In a further example, the second masking portion 62 is opaque and formed with a darker contrasting color than the color of the first masking portion 60 and/or a color of the substrate layer 56. By way of the above examples, the second masking portion 62 may be a gray or black layer that does not pass the light propagating through the first masking portion 60 and/or through the substrate layer 56.

In one example and with reference to FIG. 3, the masking layer 54 forms at least a portion of the indicia 18. By way of the above example, the masking layer 54 may form the characters 22, the tick marks 20 and/or the border 24. In one example, the tick marks 20 may include long tick marks 64 and short tick marks 66. In one example, the second masking portion 62 defines the indicia 18 because portions of the second masking portion 62 are re-moved (or omitted) to reveal the first masking portion 60 and/or the substrate layer 56. The portions of the second masking portion 62 that are removed (or omitted) form the characters 22, the tick marks 20 and/or the borders 24. In one example, the portions of the second masking portion 62 that have been reviewed may be defined as a light-passing portion 68, and the remaining portions of the second masking portion 62 may define a light-blocking portion 70.

When a suitable illumination device, for example the rear illumination device 50, illuminates the substrate layer 56, light propagates through the substrate layer 56 and the first masking portion 60. Light, however, cannot propagate through the second masking portion 62 but light does pass through the light-passing portions 68 of the second masking portion 62. As such, the first masking portion 60 and/or the substrate layer 56, as seen through the light-passing portions 68 of the second masking portion 62, appear to glow and/or illuminate and thus define the indicia 18. In one example, the light-passing portion 68 may define an aperture 72 in the second masking portion 62. The aperture 72 may have a shape that corresponds with the indicia 18 (e.g., tick marks 20, characters 22, borders 24, and/or portions or combinations thereof) or any other suitable polygonal shape.

The light-conducting layer 52 may couple to the masking layer 54. In one example, the light-conducting layer 52 includes a light-transmitting portion 74 and a light-reflecting portion 76. In one example, the light-transmitting portion 74 may be a clear polyurethane and the light-reflecting portion 76 may be a polyurethane formed with a color (i.e., not clear). In one example, the light-transmitting portion 74 includes a doping material. In one example, the doping material includes a fluorescing doping material. In one example, a material that may form the light-transmitting portion 74 with the fluorescing doping material may be obtained from Nanoptics, Inc. of Gainesville, Fla. By way of the above example, the fluorescing doping material will fluoresce when exposed to light, e.g., from the sun. In one example, the light-transmitting portion 74 fluoresces (i.e., gives off visible light) when exposed to ultra-violet light. It will be appreciated that other light sources (e.g., the illumination devices 48, 50) may cause the doping material to fluoresce but at a lesser intensity because, in some examples, the ultra-violet content may be less than ambient light from the sun.

In one example, the light-transmitting portion 74 forms a light guide with the light-reflecting portions 76 formed therein. The light guide may have an absorbing face 78 and an emitting face 80. The light guide may gather ambient light from the absorbing face 78 and emit that light out of the emitting face 80. In one example, a surface area of the absorbing face 78 is far greater than a surface area of the emitting face 80. In one example, the surface area of the absorbing face 78 is about two-orders-of-magnitude larger than the surface area of the emitting face 80. In one example, the surface area of the absorbing face 78 may define a width having a value in a range from about 200 millimeters to about 800 millimeters. In one example, the surface area of the absorbing face 78 may define a height having a value in a range from about 200 millimeters to about 600 millimeters. It will be appreciated that the height and the width of the absorbing face 78 may be defined as being coplanar to the instrument cluster but about perpendicular to one another.

In one example, the surface area of the emitting face 80 may define a thickness having a value in a range of about 1 millimeter to about 5 millimeters. In a further example, the surface area of the emitting face 80 may define a thickness having a value of about 1.5 millimeters. It will be appreciated that the thickness may defined as being about normal to the instrument cluster such a dimension between the absorbing face 78 and the second masking portion 62. Another dimension defining the surface area of the emitting face 80 is variable and is based on the indicia 18 above which the light-reflecting portions 76 may be disposed. By way of the above example, the thickness of the emitting face 80 is about two-orders-of-magnitude less than at least one of the dimensions defining the surface area of the absorbing face 78.

In one example, light absorbed by the absorbing face 78 will emit from the emitting face 80 and contact the light reflecting portion 76. In one example, the emitting face 80 of light-transmitting portion 74 and the light-reflecting portion 76 abut one another at a predetermined angle. In one example, the predetermined angle is of 45° degrees. In further examples, the angle may vary from a value greater than 0° and less than 90° such that the angle may determine the amount of light reflected toward a vehicle occupant from the light-reflecting portion 76.

In one example, a thickness 82 of the light-reflecting portion 76 is about equal to a thickness 84 of the light-transmitting portion 74. In another example, the thickness 82 of the light-reflecting portion 76 is less than the thickness 84 of the light-transmitting portion 74. By way of the above example, the light-reflecting portion 76 may be shaped in a shape similar to a prism or an elongated triangular shape. The peak of the prism may be about equal to (or flush with) a top surface of the light-transmitting portion 74 (i.e., the absorbing face 78). In a further example, the peak of the prism may be spaced beneath the surface of the light-transmitting portion 74.

With specific reference to FIG. 4C, one light-reflecting portion 76 that forms the long tick mark 64 may have a smaller thickness than the light-reflecting portion 76 that forms the border 24. By way of the above example, light not otherwise reflected by the light-reflecting portion 76 that forms the long tick mark 64 may continue thereover and contact the another light-reflecting portion 76 that forms the border 24. It may be shown by the above mentioned configuration that light may be better distributed to light-reflecting portions 76 that are adjacent to one another, thus avoiding a situation where one light-reflecting portion 76 may cast a shadow and/or deny adequate amount of light to other adjacent light reflecting portions 76.

In one example and with reference to FIG. 5, the light-reflecting portion 76 may form and/or be formed over various structures in the instrument cluster 12. By way of the above example, the light-reflecting portion 76 may be formed over (or be formed as) the tick marks 20, the characters 22 and/or the border 24. In one example, the indicia 18 may be backlit by the rear illumination device 50 and the self-illumination system 14 may enhance and/or provide a decorative appearance to the indicia 18. In one example, the indicia 18 are not backlit and the self-illumination system 14 may enhance and/or provide a decorative appearance to the indicia 18. By way of the above example, the indicia 18 are illuminated a first intensity. It will be appreciated that in this example, if sufficient light is not available for the self-illumination system 14, the indicia 18 may not be visible. In one example, the indicia 18 are backlit and the self-illumination system 14 may enhance and/or provide a decorative appearance to the indicia 18 thus illuminate the indicia at a second intensity, which is greater than a first intensity.

In one example, one or more light-reflecting portions 76 may be formed with a color, for example white or yellow. By way of the above example, the reflecting portions 76 may color the light reflected from the light reflecting portion 76. With reference to FIG. 5, the enhancement or decorative illumination from the self-illumination system 14 may have a white or yellow color.

In one example, one or more light reflecting portions are not formed over the short tick marks 66 and/or the characters 22. In one example, the self-illumination system 14 may be used for short tick marks 66 and the characters 22 but it may be shown that the reduced surface area and compound curvature of the short tick marks 66 and characters 22 relative to other indicia 18 may not provide as efficient enhancement or decorative effect relative to the long tick marks 64 and the border 24.

The light-conducting layer 52 may be formed using a 3D-doming technique. By way of the above example, the light-reflecting portion 76 may be applied using the 3D-doming technique to the masking layer 54. As such, the light-conducting layer 52 may be applied to thus form the prism or elongated triangle shapes above the indicia 18. The light-transmitting portion 74 may then be applied to the masking layer 54 also using the 3D-doming technique. In other examples, the light-reflecting portions 76 may be formed from a stock piece of polyurethane and cut to shape using computer-controlled cutting machines and/or other suitable cutting technology. By way of the above example, the light-transmitting portion 74 may be applied to the masking layer 54 and around the light-reflecting portion 76 using the 3D-doming technology. In other examples, one or of the layers 52, 54, 56 (or portions thereof) may be constructed using a suitable acrylic using, for example, an injection molding process. One suitable acrylic may include polymethyl methacrylate. It will be appreciated that other suitable materials may be used.

It will be shown that the light guide formed by the light-transmitting portion 74 is more efficient when localized regions of the light-transmitting portion 74 are parallel. More specifically, the absorbing face 78 of the light-transmitting portion 74 should be about parallel to an opposite face (i.e., a surface that contacts the masking layer 54). It will be appreciated that the overall shape of the light guide may vary (e.g., a wavy face) over the face of the instrument cluster 12. Notwithstanding, local portions are about parallel to promote the light guide efficacy. While the overall shape of the light guide may vary, the absorbing face should be about parallel to the opposite face within the local portion.

Those skilled in the art may now appreciate from the foregoing description, that the broad teachings of the present invention may be implemented in a variety of forms. While the present invention has been described in connection with various particular embodiments thereof, the true scope of the present invention should not be so limited because other modifications will become apparent to the practitioner upon a study of the drawings, the specification and the following claims.

What is claimed is:

1. A display device having indicia indicative of at least one vehicle parameter, the display device comprising:
   a light guide having a light-reflecting portion formed in said light guide;
   a substrate layer;
   a masking layer disposed between said light guide and said substrate layer,
   wherein said masking layer includes a light-passing portion and a light-blocking portion that define at least a portion of the indicia,
   wherein said light-passing portion permits light from a rear illumination device to travel through said substrate layer and through said light-reflecting portion to illuminate at least said one of the indicia,
   wherein said light guide collects and directs light from at least one of ambient light, a front illumination device and a combination thereof toward said light-reflecting portion to illuminate at least said one of the indicia by reflecting light off said light-reflecting portion and
   wherein said light-reflecting portion is immovably disposed over at least a portion of the indicia.

2. The display device of claim 1, wherein said masking layer includes a light-filtering layer that filters light by at least one of softening, adding a color, removing a color, reducing an intensity and combinations thereof.

3. The display device of claim 1, wherein said substrate layer is at least one of clear, colored and a combination thereof.

4. The display device of claim 1 wherein said rear illumination device is disposed on an opposite side of said light guide relative to said front illumination device and wherein at least said one of the indicia are configured to permit light from said rear illumination device to travel through said substrate layer and through said light-reflecting portion.

5. The display device of claim 1, wherein a face of said light-reflecting portion abuts a face of said light guide at about a forty-five degree angle.

6. The display device of claim 5, wherein said light guide includes a fluorescent doping material that is excited by ultra-violet light to produce visible light.

7. The display device of claim 1, wherein said light guide defines an absorbing face and an emitting face, wherein a surface area defined by said absorbing face is about two-orders-of-magnitude larger than a surface area defined by said emitting face and wherein said emitting face abuts a face of said light-reflecting portion.

8. The display device of claim 1, wherein said light-reflecting portion and said light guide cooperate to form a layer in the display device, wherein a portion of said layer defines a thickness and wherein said light-reflecting portion extends through all of said thickness of said portion of said layer.

9. The display device of claim 1, wherein said light-reflecting portion and said light guide cooperate to form a layer in the display device, wherein a portion of said layer defines a thickness that includes a portion of said light-reflecting portion and a portion of said light guide.

10. A display device having indicia indicative of a vehicle parameter, the display device is backlit by a first illumination device and front lit by one of ambient light, a second illumination device and a combination thereof, the display device comprising:
    a substrate layer that conducts light from the first illumination device;
    a masking layer having a light-blocking portion that blocks light from the first illumination device and light-passing portions that conduct the light from the first illumination device, wherein said light-passing portions define at least a portion of the indicia; and
    a light conducting layer having a light-reflecting portion and a light-transmitting portion, said light-reflecting portion immovably disposed above at least a portion of said light-passing portions, said light-transmitting portion directs one of the ambient light, light from the second illumination device and the combination thereof toward said light-reflecting portion in said light conducting layer,
    wherein said light passing portions permit light from the first illumination device to travel through said substrate layer and through said light-reflecting portion of said light conducting layer.

11. The display device of claim 10, wherein said masking layer includes a light-filtering layer that filters light from the first illumination device by at least one of softening, adding a color, removing a color, reducing an intensity and one or more combinations thereof.

12. The display device of claim 10, wherein said substrate layer is one of clear, colored and a combination thereof.

13. The display device of claim 10, wherein a face of said light-reflecting portion abuts a face of said light-transmitting portion at about a forty-five degree angle.

14. The display device of claim 10, wherein said light-transmitting portion includes a fluorescent doping material that is excited by ultra-violet light to produce visible light that is reflected off said light-reflecting portion to at least partially illuminate the plurality of indicia.

15. The display device of claim 10, wherein said light transmitting-portion defines an absorbing face and an emitting face, wherein a surface area defined by said absorbing face is about two-orders-of-magnitude larger than a surface area defined by said emitting face and wherein said emitting face abuts a face of said light-reflecting portion.

16. The display device of claim 10, wherein said light-reflecting portion and said light-transmitting portion cooperate to form a portion of said light conducting layer in the display device having a thickness and wherein said light-reflecting portion extends through all of said thickness of said portion of light conducting layer.

17. The display device of claim 10, wherein said light-reflecting portion and said light-transmitting portion cooperate to form a portion of said light conducting layer in the display device having a thickness that defines a portion of said light-reflecting portion and said portion of said light-transmitting portion.

18. A method of illuminating indicia of a display device indicative of a vehicle parameter, the method comprising:

illuminating the indicia through a substrate layer with light from a rear illumination device;

providing a masking layer on the substrate layer that blocks light from the rear illumination device with a light-blocking portion and conducts light from the rear illumination device with a light-passing portion, wherein the light-passing portion defines at least a portion of the indicia;

illuminating the indicia from an opposite side of the substrate layer with light from one of ambient light, a front illumination device and a combination thereof;

providing a light guide connected to the masking layer, wherein the masking layer is disposed between the light guide and the substrate layer and wherein the light guide includes a light-reflecting portion formed therein and immovably disposed over at least a portion of the indicia;

gathering light with the light guide from one of the ambient light, the front illumination device and the combination thereof;

reflecting the light from the light guide off the light-reflecting portion in the light guide, wherein the light-reflecting portion is at least partially disposed over the light-passing portion of the masking layer; and passing light from the rear illumination device through the light-passing portion of the masking layer and through the light-reflecting portion of the light guide.

19. The method of claim 18 further comprising rotating a pointer relative at least a portion of the indicia to indicate a value of the vehicle parameter.

20. The method of claim 18 further comprising forming at least one of the light guide and the light-reflecting portion with 3-D doming.

* * * * *